Dec. 24, 1963 H. O. NORTHERN ET AL 3,115,032
DEVICE FOR MEASURING THE DISPLACEMENT OF A ROTATING BODY
Filed Oct. 13, 1960 3 Sheets-Sheet 1

INVENTORS
HARRY O. NORTHERN
HARRY F. PESEL
ROLAND E. PRUITT
ROBERT F. WHITE
BY Frank J. Loucek
ATTORNEY Dec. 24, 1963     H. O. NORTHERN ET AL     3,115,032
DEVICE FOR MEASURING THE DISPLACEMENT OF A ROTATING BODY
Filed Oct. 13, 1960     3 Sheets-Sheet 2

INVENTORS
HARRY O. NORTHERN
HARRY F. PESEL
ROLAND E. PRUITT
ROBERT F. WHITE
BY Frank J. Soucek
ATTORNEY Dec. 24, 1963     H. O. NORTHERN ET AL     3,115,032
DEVICE FOR MEASURING THE DISPLACEMENT OF A ROTATING BODY
Filed Oct. 13, 1960     3 Sheets-Sheet 3

INVENTORS
HARRY O. NORTHERN
HARRY F. PESEL
ROLAND E. PRUITT
ROBERT F. WHITE

BY Frank J. Soucek

ATTORNEY

United States Patent Office 3,115,032
Patented Dec. 24, 1963

3,115,032
DEVICE FOR MEASURING THE DISPLACEMENT OF A ROTATING BODY
Harry O. Northern, Harry F. Pesel, Roland E. Pruitt, and Robert F. White, all of Indianapolis, Ind., assignors to General Motors Corporation, Detroit, Mich., a corporation of Delaware
Filed Oct. 13, 1960, Ser. No. 62,386
8 Claims. (Cl. 73—71.4)

This invention relates to a measuring device and more particularly to a pulse generating device for measuring axial and radial movement of rotating parts.

In the design and development of machines having rotating parts such as the shafts and couplings of turbines it is often necessary to study the vibrational characteristics of such parts.

Accordingly, it is an object of this invention to provide means of simultaneously measuring the axial vibration and the radial vibration or "whip" of rotating parts while the machine is in operation, and to provide such a measuring means which requires only a slight modification of the machine to be tested.

The above and other objects and advantages of this invention will be made more apparent from the following description when read in connection with the accompanying drawings, wherein like reference numerals refer to like parts and wherein.

Figure 1:
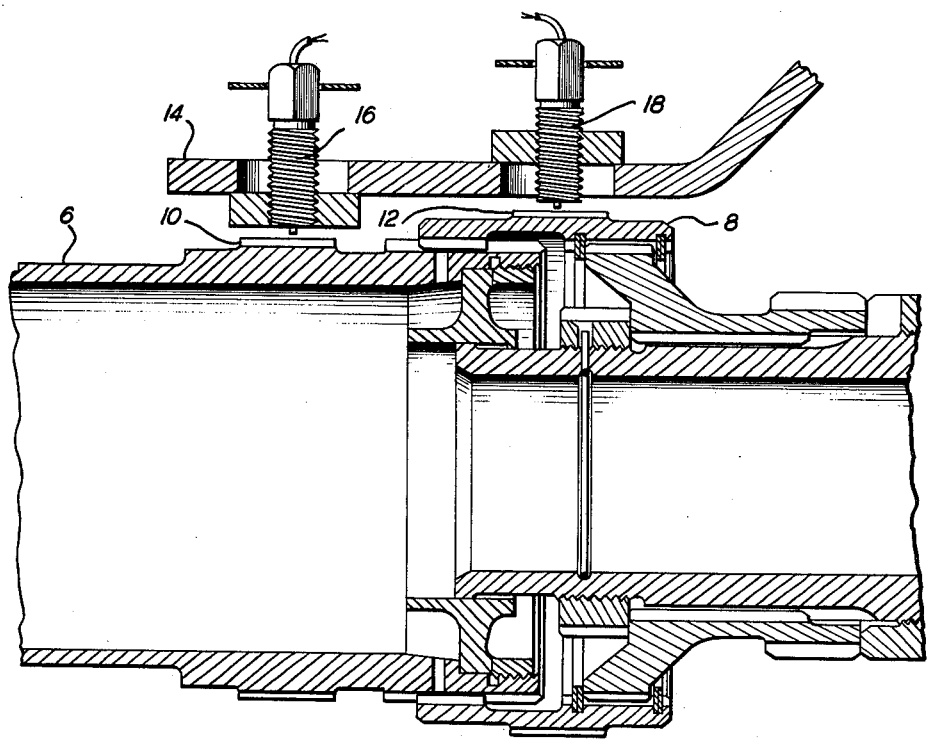
FIGURE 1 is a cross-sectional view of a turbine shaft and coupling assembly embodying the invention.

As shown in FIGURE 1, a turbine shaft 6 engages a turbine coupling 8. Each of these members has an exciter wheel 10 and 12, respectively, of magnetic material, integrally formed therewith. It is readily apparent that these exciter wheels could be made separately and attached to a standard shaft or coupling. A bracket 14 connected to the turbine housing (not shown) carries magnetic pickups 16 and 18 and holds them adjacent the exciter wheels 10 and 12, respectively. Each of the pickups 16 and 18 are axially adjustable with respect to the bracket so that the gap between each pickup and its respective exciter wheel may be regulated.

Figure 2:
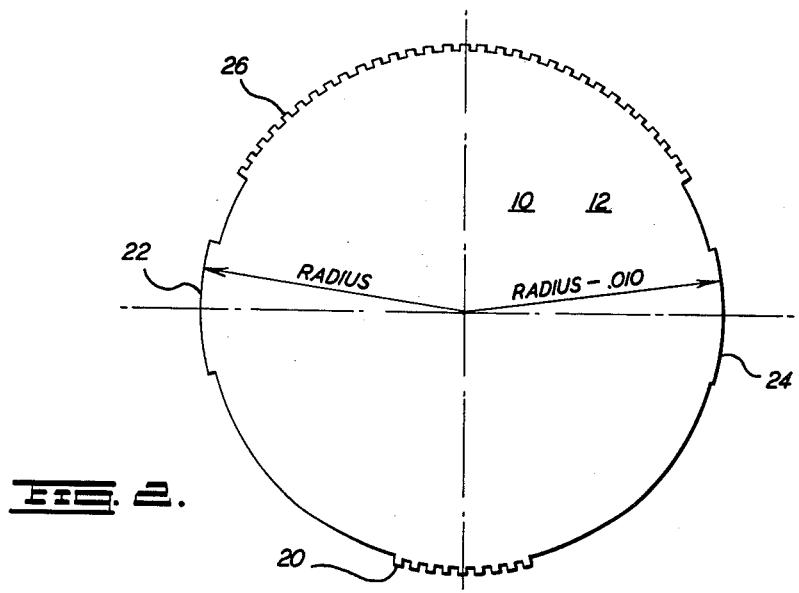
FIGURE 2 is a side view of an exciter wheel constructed according to the present invention.

A side view of wheels 10 and 12, which are identical in configuration, is shown in FIGURE 2. The periphery of the wheel carries a series of projections which serve to generate pulses in the magnetic pickup upon rotation of the wheel. Certain of the projections are used for calibration purposes, while others are used to indicate vibration of the turbine shaft. An arcuate series of axial calibration teeth 20 is formed on the lower portion of the wheel and extends across the full width of the wheel rim in a direction parallel to the axis of rotation of the wheel. Whip calibration exciter land portions 22 and 24 are spaced on opposite sides of the wheel about 90° from the axial calibration teeth 20. The radius of land 22 is slightly larger than the radius of land 24. It has been found that the radial difference of one-hundredth inch is satisfactory for calibration purposes. An arcuate series of axial deflection measuring teeth 26 is located opposite the calibration teeth 20.

Figure 3:
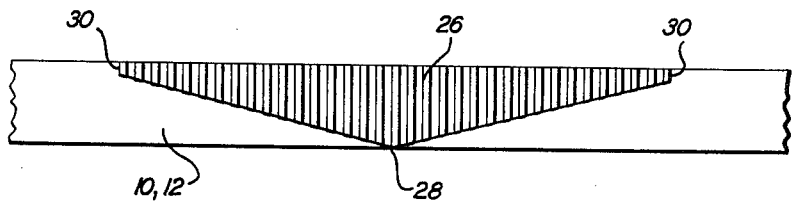
FIGURE 3 is a developed view showing the exciter teeth according to the invention.

This series of teeth 26, as best shown in FIGURE 3, is characterized by the fact that the teeth are of varying axial length with the central tooth 28 extending the full width of the wheel rim and each successive tooth being progressively shorter. Hence, the ends of the teeth form a V with the longest tooth 28 in the center and the shortest teeth 30—30 being at the extreme ends.

In operation, as the turbine shaft rotates each exciter wheel will rotate past its respective pickup and pulsations will be generated in the pickup by the exciter wheel projections. These pulses are recorded on an oscillograph or other conventional detecting apparatus. The strength of the signal produced by the pickup as shown by the amplitude of the curve on the oscillograph is an indication of the size of the gap between the wheel and the pickup, thus providing a measure of the radial deflection of the turbine shaft or coupling at any instant. The amount of radial deflection may be measured by comparing the height of the curve to the differential size of the pips caused by the whip calibration exciter lands 22 and 24. Since the gap between each of these lands and the pickup varies by one-hundredth inch, the pulses produced by these lands will be of different strengths and will provide a standard by which any other pulses may be interpreted.

To determine axial displacement of the shaft, it is necessary merely to observe the signal produced by the axial deflection measuring teeth 26. It is obvious that as the exciter wheel moves axially with respect to the magnetic pickup different signals will be produced, depending upon the number of teeth moving past the pickup. The axial calibration teeth 20 will develop a standard wave form which is independent of the axial displacement of the exciter wheel, thereby providing a standard with which to compare the signal from teeth 26 to determine the direction and amount of displacement.

Figure 4:
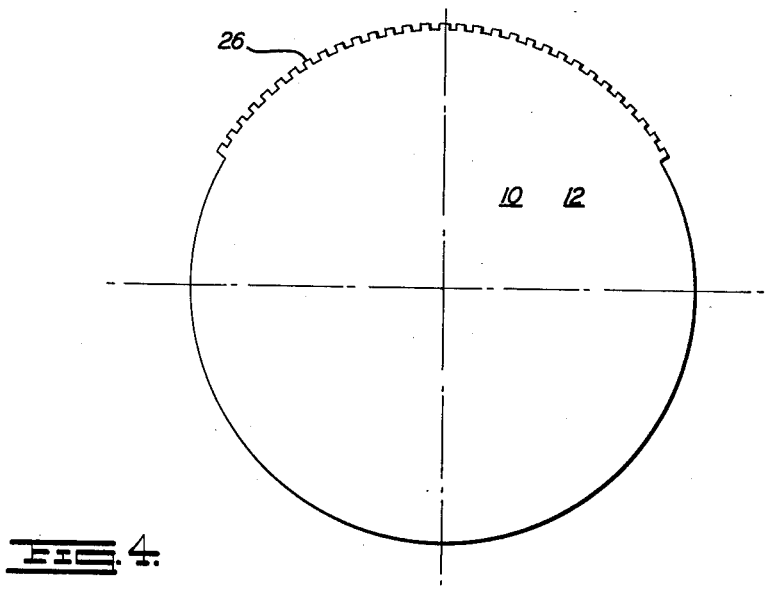
FIGURE 4 is a side view of another embodiment of an exciter wheel according to the present invention.

It has been found that the exciter wheel may be modified as shown in FIGURE 4, so that only the series of axial displacement measuring teeth 26 is provided but the axial displacement calibration teeth 20 and the whip calibration exciter lands 22 and 24 of FIGURE 2 are entirely eliminated. With this construction the series of teeth 26 will generate signals, as in the previously described embodiment of the invention, with the strength of the signals indicating radial displacement or vibration and with the wave form indicating the number of teeth passing the pickup.

With this structure of FIGURE 4 no automatic calibration feature is provided; hence, it is necessary to establish a predetermined gap between the wheel and the pickup by use of a feeler gage during assembly of the turbine or at some other time prior to operation. Similarly, calibration of the axial displacement measuring feature must also be made prior to operation of the turbine.

Figure 5:
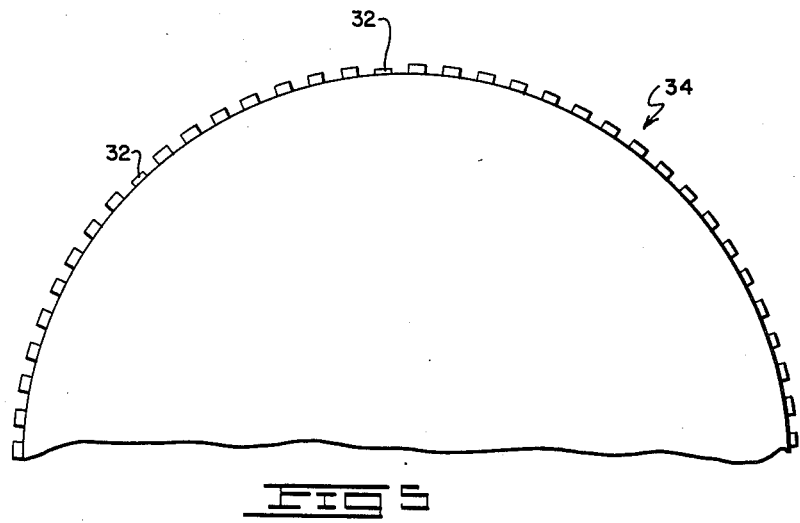
FIGURE 5 is a partial side view of a modification of an axial-radial motion measurement device in accordance with the present invention.
Figure 6:
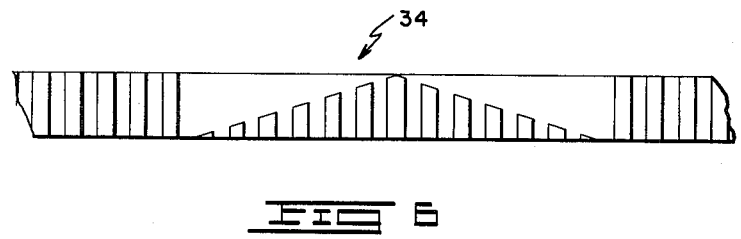
FIGURE 6 is a partial radial view of FIGURE 5.

An improved form of the self calibrating radial measurement part of the axial-radial measurement device can be made with a fully toothed wheel as shown in FIGURES 5 and 6 with short teeth 32 for radial motion (whip) calibration. This method can be used in conjunction with the axial motion part of the measurement device by having a tapered tooth portion 34 as shown in FIGURE 6.

This latter radial motion method may be used in engine testing to measure whip of compressor and turbine rotors with the bladed rotor acting as a toothed wheel and with calibration blades ground a few thousandths shorter (typically .005", .010" and .020") before the rotor is balanced.

Adaptation of this principle to dynamic axial motion measurement can be done by placing the pickup at the leading edge of the blades with calibration blades ground back from the leading edge side.

The magnetic pickup device is well known in the electrical measuring art and accordingly is not described in detail herein. It should be noted that other types of pickup may be used within the spirit of this invention. For example, it is possible to substitute a condenser pickup wherein a plate is located adjacent the exciter wheel and the wheel itself acts as the other plate if it is connected to the detecting circuit. The varying capacitance between the two "plates" will give an indication of shaft vibration.

It is thus readily apparent that the above described invention will provide an accurate and convenient means of measuring the radial and axial vibration of a turbine shaft, turbine coupling, or other rotating parts.

What we claim is:

1. In a shaft vibration measuring device, a wheel mounted on said shaft; said wheel having on its periphery an arcuate toothed section with a central tooth extending across the full width of the wheel rim and each successively adjacent tooth having a progressively decreased axial length, a second arcuate toothed section with teeth extending the full width of the wheel rim, a land portion, and a second land portion of slightly smaller radius than the first land portion; and a magnetic pickup means closely adjacent the wheel periphery to detect the passage of the various teeth and lands upon rotation of the wheel.

2. In a measuring device, a rotatable exciting wheel having an arcuate toothed section with teeth of varying axial length, and a pickup means adjacent said exciting wheel, the material of said wheel being such to cause a response in said pickup means, said pickup means acting in cooperation with the teeth of said exciting wheel to develop electrical signals in response to the number of teeth passing the pickup and the distance between the teeth and the pickup means whereby the axial and radial displacement of the wheel may be detected and measured.

3. In a measuring device, a rotatable exciting wheel composed of a magnetic material having an arcuate toothed section with teeth of varying axial length, and a magnetic pickup means adjacent said exciting wheel, said magnetic pickup means acting in cooperation with the teeth of said exciting wheel to develop signals in response to the number of teeth passing the magnetic pickup and the distance between the teeth and the magnetic pickup means whereby the axial and radial displacement of the wheel may be detected and measured.

4. In a measuring device, a rotatable exciting wheel composed of a metallic material having an arcuate toothed section with teeth of varying axial length, and a capacitive pickup means adjacent said exciting wheel, said capacitive pickup means acting in cooperation with the teeth of said exciting wheel to develop signals in response to the number of teeth passing the capacitive pickup and the distance between the teeth and the capacitive pickup means whereby the axial and radial displacement of the wheel may be detected and measured.

5. The measuring device of claim 2 in which the exciter wheel includes an arcuate toothed section having spaced teeth of varying height.

6. The measuring device of claim 2 in which the exciter wheel toothed section includes a central tooth extending across the full width of the wheel periphery and each successively adjacent tooth having a progressively decreased axial length.

7. In a device for measuring the radial deflection of a rotating part, an exciter wheel secured to said part; said wheel comprising a toothed portion wherein said toothed portion includes spaced teeth of different heights, and a pickup means located adjacent the periphery of said wheel, the material of said wheel being such to cause a response in said pickup means, said pickup means in cooperation with the teeth of said exciting wheel developing electrical signals in response to the distance between the teeth and the pickup means.

8. In a shaft vibration measuring device, an exciter wheel having calibration means on the wheel periphery comprising a first land of a given radius, and a second land having a radius smaller than said first radius by a predetermined amount; and a pickup means adjacent the periphery of said wheel, the mtaerial of said wheel being such to cause a response in said pickup means, said pickup means having an electrical output signal which is a function of the size of the gap between the pickup and the wheel whereby the difference of the electrical signals produced by the first land passing the pickup means and the second land passing the pickup means provides a calibration standard by which the gap spacing at any point on the wheel periphery passing the pickup may be determined from the pickup electrical signal.

References Cited in the file of this patent
UNITED STATES PATENTS 2,864,997    Von Basel _____ Dec. 16, 1958